(12) United States Patent
Liu et al.

(10) Patent No.: US 11,106,289 B2
(45) Date of Patent: Aug. 31, 2021

(54) MOUSE DEVICE

(71) Applicant: Chicony Electronics Co., Ltd., New Taipei (TW)

(72) Inventors: Chin-Sheng Liu, New Taipei (TW); Jung-Hsiu Lee, New Taipei (TW)

(73) Assignee: Chicony Electronics Co., Ltd., New Taipei (TW)

(*) Notice: Subject to any disclaimer, the term of this patent is extended or adjusted under 35 U.S.C. 154(b) by 0 days.

(21) Appl. No.: 17/037,650

(22) Filed: Sep. 29, 2020

(65) Prior Publication Data
US 2021/0132706 A1 May 6, 2021

Related U.S. Application Data

(60) Provisional application No. 62/929,107, filed on Nov. 1, 2019.

(30) Foreign Application Priority Data

Jan. 22, 2020 (TW) .................................. 109102628

(51) Int. Cl.
*G06F 3/0354* (2013.01)
*G06F 3/038* (2013.01)

(52) U.S. Cl.
CPC .......... *G06F 3/03543* (2013.01); *G06F 3/038* (2013.01)

(58) Field of Classification Search
CPC .............................. G06F 3/03543; G06F 3/038
See application file for complete search history.

(56) References Cited

U.S. PATENT DOCUMENTS

| | | | | |
|---|---|---|---|---|
| 5,268,674 A * | 12/1993 | Howard | ............... | G06F 3/03543 200/318 |
| 5,828,364 A * | 10/1998 | Siddiqui | ............... | G06F 3/0312 345/163 |
| 6,011,543 A * | 1/2000 | Tian | ............... | G06F 3/03543 345/157 |
| 6,154,196 A * | 11/2000 | Fleck | ............... | G06F 3/03543 345/156 |
| 6,243,078 B1 * | 6/2001 | Rosenberg | ............... | A63F 13/06 345/161 |
| 2001/0005198 A1 * | 6/2001 | Sakamoto | ............... | G06F 3/03543 345/163 |
| 2002/0171621 A1 * | 11/2002 | Johnson | ............... | G06F 3/03543 345/156 |
| 2018/0373354 A1 * | 12/2018 | Hsiao | ............... | G06F 3/03543 |

FOREIGN PATENT DOCUMENTS

| | | |
|---|---|---|
| TW | 162019 B | 11/2001 |
| TW | M559448 U | 5/2018 |
| TW | 201935194 A | 9/2019 |

* cited by examiner

*Primary Examiner* — Ariel A Balaoing
(74) *Attorney, Agent, or Firm* — CKC & Partners Co., LLC

(57) ABSTRACT

A mouse device includes a housing, a switch, a button, and a biasing member. The housing has an accommodating space therein. The switch is disposed in the accommodating space. The button covers the housing and includes a pivotal portion and a trigger portion. The pivotal portion is pivotally connected to the housing. The trigger portion extends into the accommodating space. The biasing member is located between the pivotal portion and the trigger portion and downwardly exerts a force to the button in an upward-downward axial direction of the mouse device.

8 Claims, 4 Drawing Sheets

MOUSE DEVICE

CROSS-REFERENCE TO RELATED APPLICATION

This application claims priority to U.S. Provisional Application Ser. No. 62/929,107, filed Nov. 1, 2019, and Taiwan Application Serial Number 109102628, filed Jan. 22, 2020, the disclosures of which are incorporated herein by reference in their entireties.

BACKGROUND

Technical Field

The present disclosure relates to a mouse device.

Description of Related Art

As important external input devices of computers, mouse devices allow users to move cursors on computer screens quickly by moving the mouse devices and allow the users to perform quick input operations such as confirmation, cancellation, and the like by the operation of the mouse devices. Therefore, the mouse devices greatly improve convenience for the users to operate the computers.

A button of a conventional mouse generally uses a cantilever design. When pressing the button, a user can deform the button by utilizing the elasticity of the button made of plastic to trigger the switch. After releasing the button, the button can restore to its original position by the utilizing the elasticity thereof. However, the disadvantage of this design is that due to the accumulation of manufacturing tolerances and assembly tolerances of parts, problems such as idle stroke or overpressure occur during mass production, which causes the force and feel of triggering the button to be unstable. At the same time, if the user wants to trigger the switch successfully, the applied force must be greater than the force that can trigger the switch plus the force that deforms the button elastically, which limits the design of light press feeling of the button.

Accordingly, how to provide a mouse device to solve the aforementioned problems becomes an important issue to be solved by those in the industry.

SUMMARY

An aspect of the disclosure is to provide a mouse device that can efficiently solve the aforementioned problems.

According to an embodiment of the disclosure, a mouse device includes a housing, a switch, a button, and a biasing member. The housing has an accommodating space therein. The switch is disposed in the accommodating space. The button covers the housing and includes a pivotal portion and a trigger portion. The pivotal portion is pivotally connected to the housing. The trigger portion extends into the accommodating space. The biasing member is located between the pivotal portion and the trigger portion and downwardly exerts a force to the button in an upward-downward axial direction of the mouse device.

In an embodiment of the disclosure, the mouse device further includes an abutting structure. The abutting structure is connected to the button and extends into the accommodating space. The biasing member contacts the abutting structure and the housing.

In an embodiment of the disclosure, the button further includes an extending portion extending into the accommodating space. The abutting structure is connected to the extending portion. The biasing member is abutted between the abutting structure and the housing.

In an embodiment of the disclosure, the abutting structure is movably engaged with the extending portion.

In an embodiment of the disclosure, the extending portion has a screw hole. The abutting structure includes a threaded portion and a head portion connected to each other. The threaded portion and the screw hole are screwed each other. The biasing member is abutted between the head portion and the housing.

In an embodiment of the disclosure, the biasing member is a spring sleeved onto the extending portion.

In an embodiment of the disclosure, the mouse device further includes a washer abutted between the housing and the biasing member.

In an embodiment of the disclosure, the housing has a through hole. The biasing member extends into the accommodating space via the through hole.

In an embodiment of the disclosure, the housing further has two guiding walls. The guiding walls protrude into the accommodating space and are connected to opposite sides of the through hole, respectively.

In an embodiment of the disclosure, an outer surface of the housing is partially recessed toward the accommodating space to form a recessed portion. The housing further has a pivotal hole located in the recessed portion. The pivotal portion is pivotally connected to the pivotal hole in the recessed portion.

Accordingly, in the mouse device of the present disclosure, the button is pivotally connected to the housing by the pivotal portion, so a user does not need to overcome the elastic force generated by a conventional button using a cantilever design when pressing the button. Even if the manufacturing tolerances and assembly tolerances of parts are accumulated, the button of the present disclosure can maintain the contact state with the switch by virtue of its own gravity. Therefore, the button of the present disclosure not only does not have the problems of idle stroke and overpressure, but also can meet the design requirements of light press feeling. Furthermore, by providing the biasing member in the mouse device of the present disclosure to apply a force to the housing and the button, the button can be kept in contact with the switch. Therefore, even if the mouse device of the present disclosure is shaken or tilted, the button can still be kept in contact with the switch without shaking.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
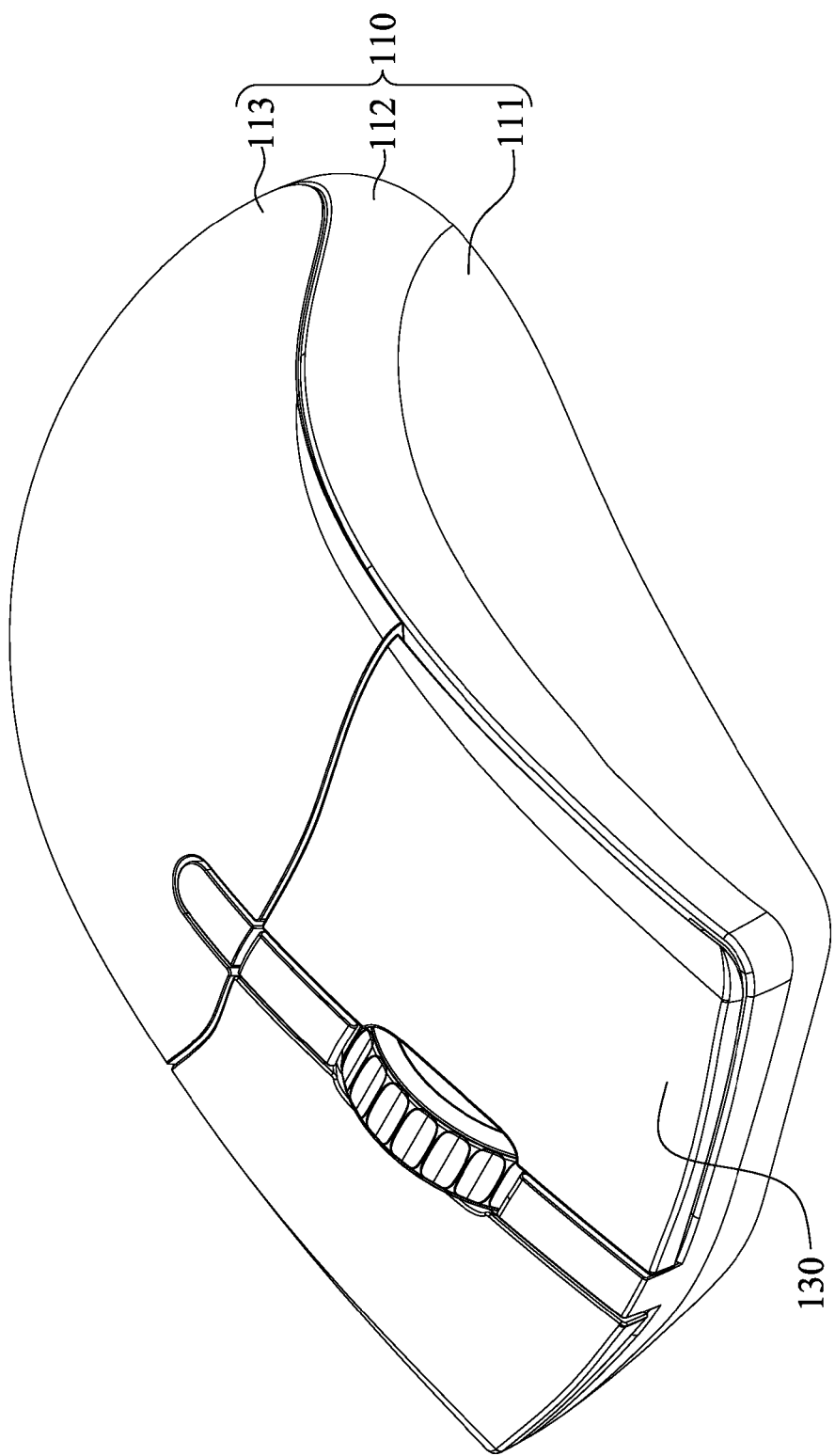
FIG. 1 is a perspective view of a mouse device according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Figure 2:
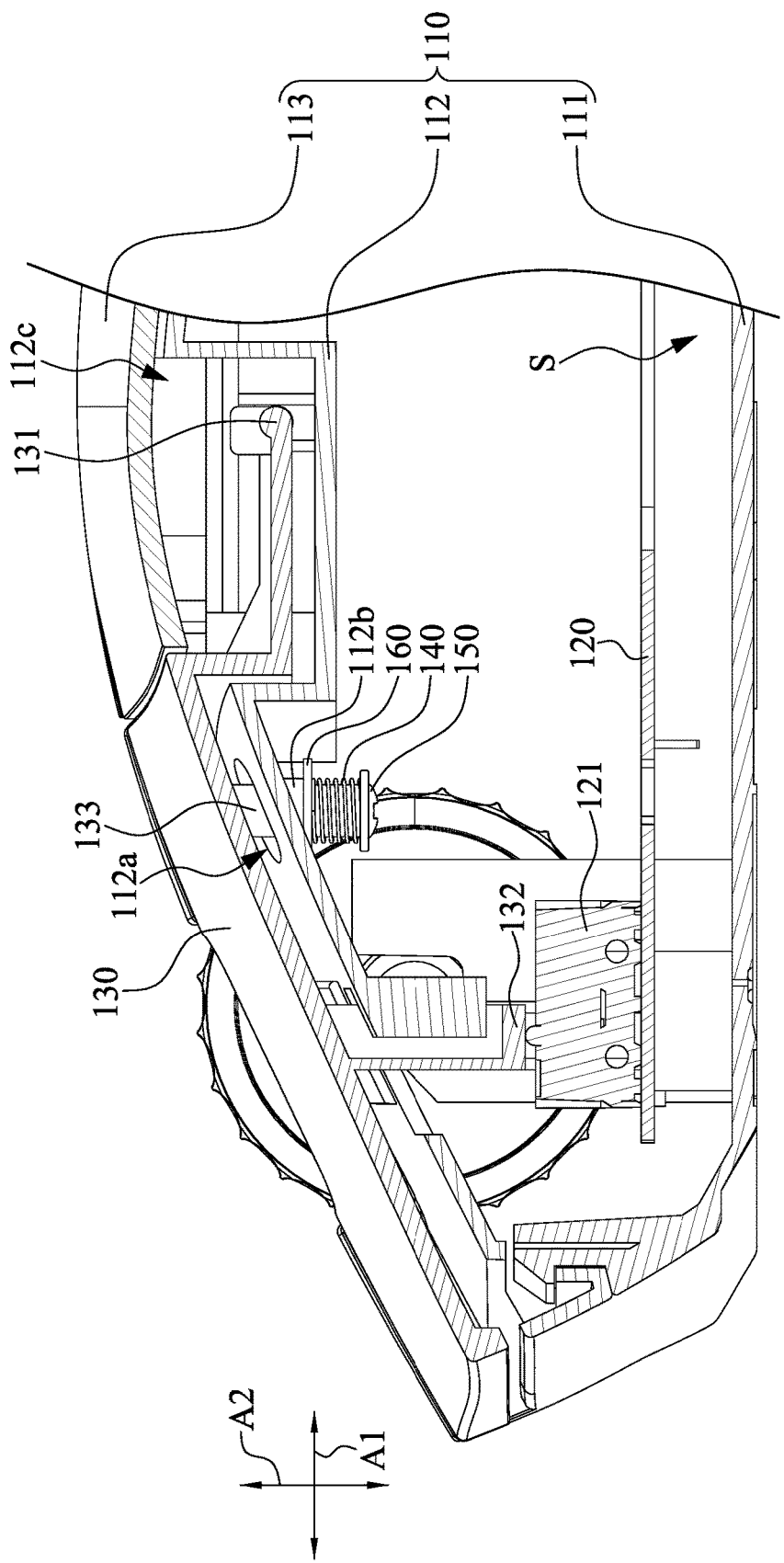
FIG. 2 is a partial cross-sectional view of the mouse device in FIG. 1.
Figure 3:
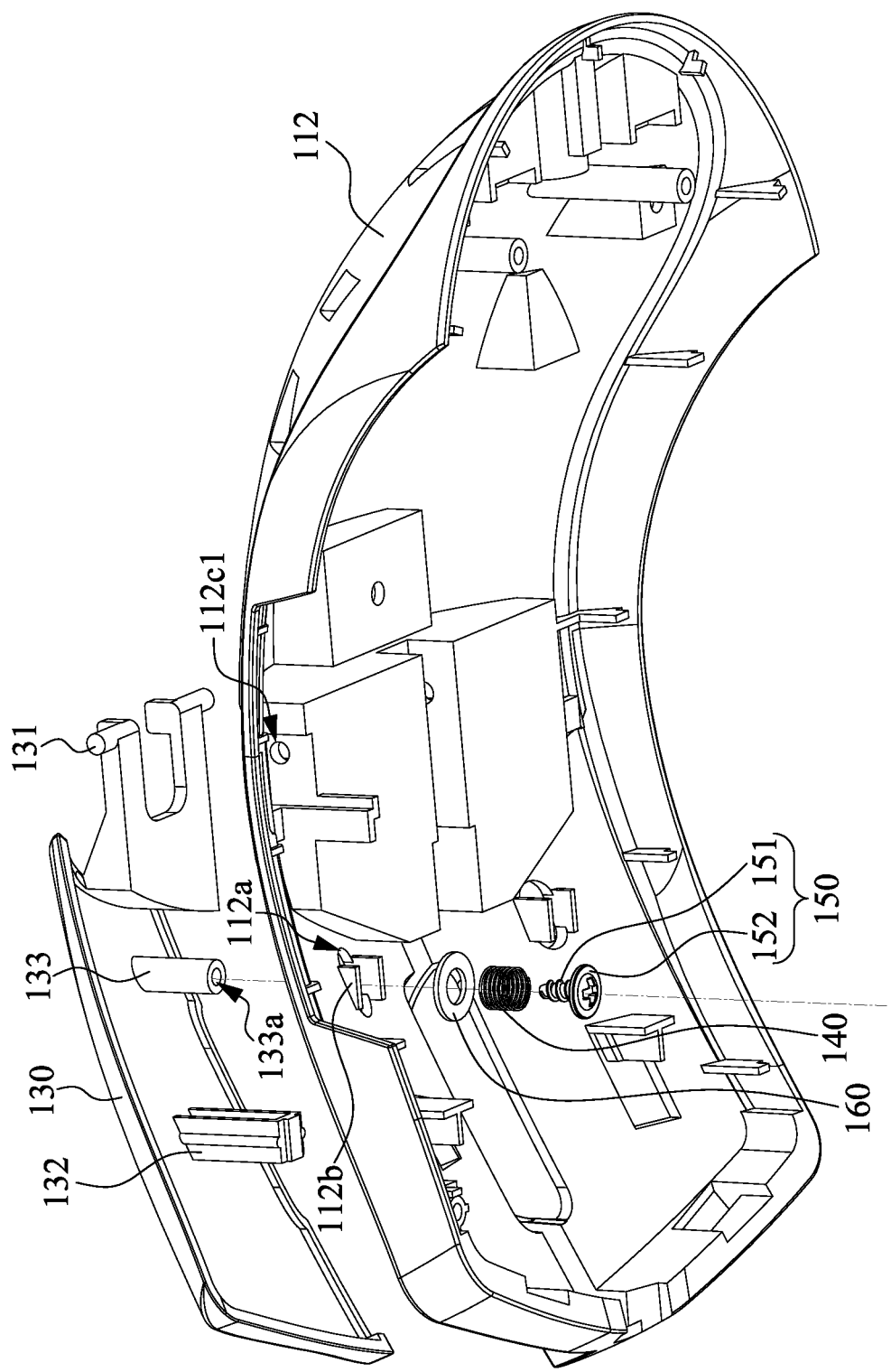
FIG. 3 is an exploded view of some parts of the mouse device in FIG. 1.

Reference is made to FIGS. 1, 2, and 3. FIG. 1 is a perspective view of a mouse device 100 according to an embodiment of the disclosure. FIG. 2 is a partial cross-sectional view of the mouse device 100 in FIG. 1. FIG. 3 is an exploded view of some parts of the mouse device 100 in FIG. 1. As shown in FIGS. 1 and 2, the mouse device 100 includes a housing 110, a circuit board 120, a button 130, and a biasing member 140. The housing 110 includes a bottom case 111, a top case 112, and an outer cover 113. The bottom case 111 and the top case 112 are detachably assembled, and an accommodating space S is formed between the bottom case 111 and the top case 112. The outer cover 113 is detachably assembled on a side of the top case 112 away from the bottom case 111, and constitutes at least a part of an appearance surface of the mouse device 100. The circuit board 120 is located in the accommodating space S, and a switch 121 is disposed on the circuit board 120. The button 130 covers the top case 112 and includes a pivotal portion 131 and a trigger portion 132. The pivotal portion 131 is pivotally connected to a pivotal hole 112c1 (referred to FIG. 3) of the top case 112. Specifically, an outer surface of the top case 112 (i.e., the surface of the top case 112 away from the accommodating space S) is partially recessed toward the accommodating space S to form a recessed portion 112c (referred to FIG. 2), and the pivotal hole 112c1 is located in the recessed portion 112c. In other words, the pivotal portion 131 of the button 130 is pivotally connected to the pivotal hole 112c1 in the recessed portion 112c. In addition, the front and rear sections of the outer surface of the top case 112 are covered by the button 130 and the outer cover 113, respectively. Therefore, it can be seen that the button 130 and the outer cover 113 together constitute a smooth upper appearance surface of the mouse device 100 and cover the recessed portion 112c below. The trigger portion 132 extends into the accommodating space S. The biasing member 140 is located between the pivotal portion 131 and the trigger portion 132 and downwardly exerts a force to the button 130 in an upward-downward axial direction A2 of the mouse device 100, so that the trigger portion 132 keeps contacting the switch 121.

With the foregoing structural configurations, a user does not need to overcome the elastic force generated by a conventional button using a cantilever design when pressing the button 130. Hence, even if the manufacturing tolerances and assembly tolerances of parts are accumulated, the button 130 of the present embodiment can maintain the contact state with the switch 121 by virtue of its own gravity. Therefore, the button 130 of the present embodiment not only does not have the problems of idle stroke and overpressure, but also can meet the design requirements of light press feeling.

Figure 4:
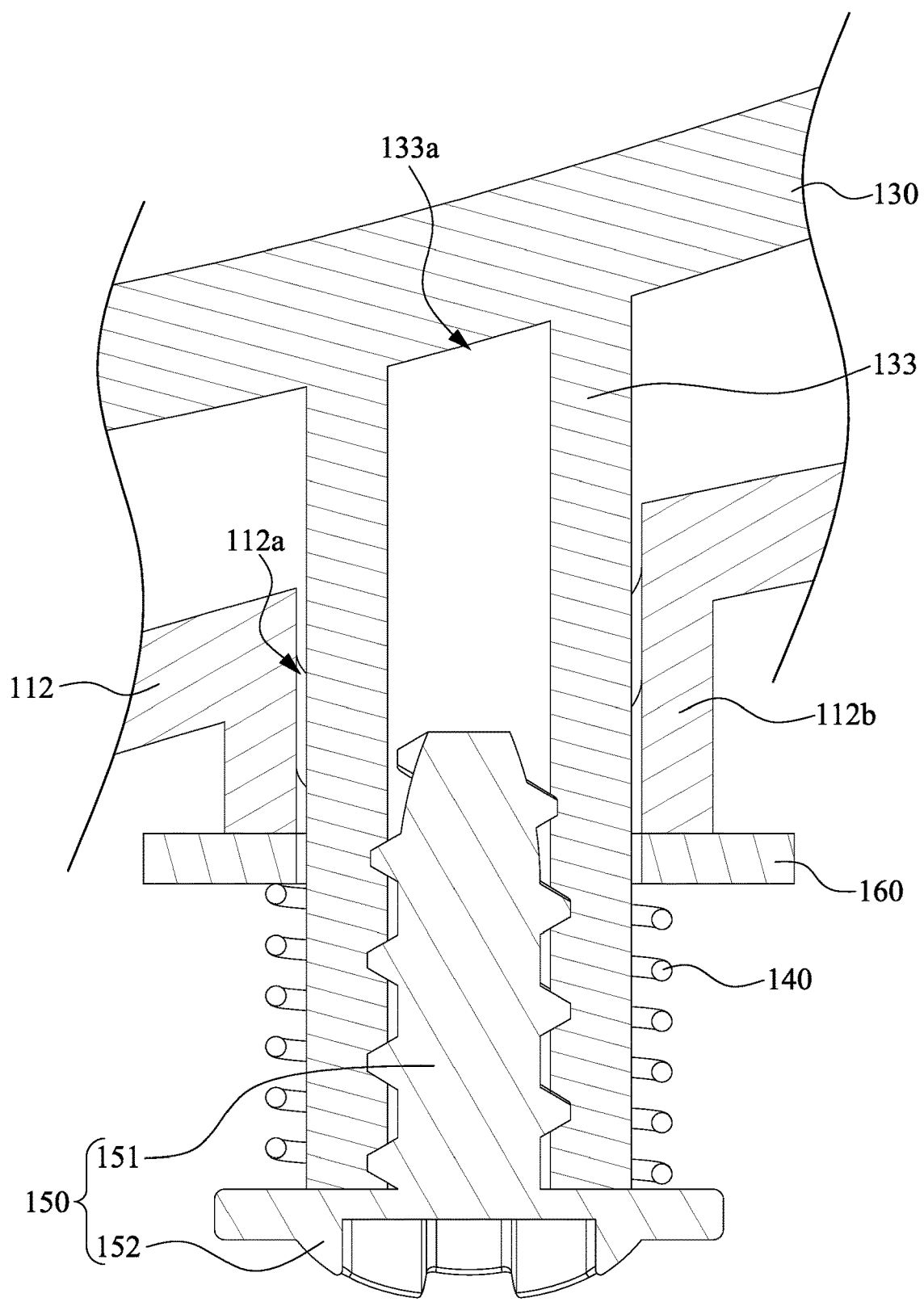
FIG. 4 is another partial cross-sectional view of the mouse device in FIG. 1.

As shown in FIGS. 1 and 2, the mouse device 100 further includes an abutting structure 150. The abutting structure 150 is connected to the button 130 and extends into the accommodating space S. The biasing member 140 contacts the abutting structure 150 and the top case 112 of the housing 110. Specifically, reference is made to FIGS. 3 and 4. FIG. 4 is another partial cross-sectional view of the mouse device 100 in FIG. 1. As shown in FIGS. 2 to 4, the button 130 further includes an extending portion 133 extending into the accommodating space S. The extending portion 133 is located between the pivotal portion 131 and the trigger portion 132 in a forward-backward axial direction A1 of the mouse device 100. The trigger portion 132 and the extending portion 133 substantially extend downward in the upward-downward axial direction A2 of the mouse device 100. The abutting structure 150 is connected to the extending portion 133. The biasing member 140 is abutted between the abutting structure 150 and the top case 112 of the housing 110.

Specifically, the extending portion 133 of the button 130 has a screw hole 133a. The abutting structure 150 includes a threaded portion 151 and a head portion 152 connected to each other. The threaded portion 151 and the screw hole 133a are screwed each other. In other words, the extending portion 133 of the button 130 and the abutting structure 150 are screwed each other. A width of the head portion 152 is greater than a width of the threaded portion 151, so the biasing member 140 can be abutted between the head portion 152 and the top case 112 of the housing 110. In some embodiments, the biasing member 140 is a spring (e.g., a compression spring) and is sleeved onto the extending portion 133 of the button 130. Therefore, the biasing member 140 can exert a force that can bring the top case 112 and the button 130 (via the abutting structure 150) of the housing 110 closer to each other, and the extending portion 133 of the button 130 can also retain the biasing member 140. In other words, the biasing member 140 bears on the top case 112 and provides a stable downward force on the button 130 in the upward-downward axial direction A2 of the mouse device 100 via the abutting structure 150.

With the foregoing structural configurations, the trigger portion 132 of the button 130 can be kept in contact with the switch 121. Therefore, even if the mouse device 100 of the present embodiment is shaken or tilted, the button 130 can still be kept in contact with the switch 121 without shaking.

In addition, since the extending portion 133 of the button 130 and the abutting structure 150 are screwed together, it represents that the abutting structure 150 is movably connected to the extending portion 133. Hence, by controlling the depth of the threaded portion 151 of the abutting structure 150 into the screw hole 133a of the extending portion 133, the user can adjust the distance between the head portion 152 and the top case 112 of the abutting structure 150, thereby adjusting the force exerted by the biasing member 140 on the top case 112 and the button 130 (via the abutting structure 150) of the housing 110.

In practical applications, the abutting structure 150 and the button 130 can also be two connected parts of a unitary structure, and can be made of plastic through an injection molding process, but the disclosure is not limited in this regard.

In some embodiments, as shown in FIGS. 2 to 4, the mouse device 100 further includes a washer 160. The washer 160 is abutted between the top case 112 and the biasing member 140. Therefore, abrasion between the top case 112 and the biasing member 140 can be effectively avoided.

On the other hand, as shown in FIGS. 2 to 4, the top case 112 of the housing 110 has a through hole 112a. The abutting structure 150 extends into the accommodating space S via the through hole 112a. As can be seen from FIGS. 2 and 3, since the button 130 swings relative to the top case 112 with the pivotal portion 131 as the rotation axis when the button 130 is pressed, the through hole 112a of the top case 112 has a maximum width on a plane (e.g., the plane shown in FIG. 2) perpendicular to the axial direction of the pivotal portion 131, so as to allow the extending portion 133 passing through the through hole 112a not to hit the inner wall of the through hole 112a when it swings with the button 130.

As shown in FIGS. 3 and 4, the top case 112 of the housing 110 further has two guiding walls 112b. The guiding walls 112b protrude into the accommodating space S and are connected to opposite sides of the through hole 112a, respectively. With the structural configurations, the extending portion 133 of the button 130 can be effectively retained, thereby preventing the button 130 from swinging without using the pivotal portion 131 as a rotation axis. In order to achieve the aforementioned retaining function, the distance between the two guiding walls 112b is smaller than the aforementioned maximum width of the through hole 112a. In addition, as shown in FIG. 4, the washer 160 is abutted between the biasing member 140 and the two guiding walls 112b.

It should be noted that the biasing member 140 is not limited to being disposed in the mouse device 100 in the manner described above. In practical applications, a biasing member may include two magnets that can attract each other and are respectively disposed on the top case 112 and the button 130, and the purpose of applying forces to the top case 112 and the button 130 to bring them closer can also be achieved.

According to the foregoing recitations of the embodiments of the disclosure, it can be seen that in the mouse device of the present disclosure, the button is pivotally connected to the housing by the pivotal portion, so a user does not need to overcome the elastic force generated by a conventional button using a cantilever design when pressing the button. Even if the manufacturing tolerances and assembly tolerances of parts are accumulated, the button of the present disclosure can maintain the contact state with the switch by virtue of its own gravity. Therefore, the button of the present disclosure not only does not have the problems of idle stroke and overpressure, but also can meet the design requirements of light press feeling. Furthermore, by providing the biasing member in the mouse device of the present disclosure to apply a force to the housing and the button, the button can be kept in contact with the switch. Therefore, even if the mouse device of the present disclosure is shaken or tilted, the button can still be kept in contact with the switch without shaking.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A mouse device, comprising:
   a housing having an accommodating space therein;
   a switch disposed in the accommodating space;
   a button covering the housing and comprising a pivotal portion and a trigger portion, the pivotal portion being pivotally connected to the housing, the trigger portion extending into the accommodating space;
   a biasing member located between the pivotal portion and the trigger portion and downwardly exerting a force to the button in an upward-downward axial direction of the mouse device; and
   an abutting structure connected to the button and extending into the accommodating space, wherein the biasing member contacts the abutting structure and the housing,
   wherein the button further comprises an extending portion extending into the accommodating space, the abutting structure is connected to the extending portion, and the biasing member is abutted between the abutting structure and the housing.

2. The mouse device of claim 1, wherein the abutting structure is movably engaged with the extending portion.

3. The mouse device of claim 2, wherein the extending portion has a screw hole, the abutting structure comprises a threaded portion and a head portion connected to each other, the threaded portion and the screw hole are screwed each other, and the biasing member is abutted between the head portion and the housing.

4. The mouse device of claim 1, wherein the biasing member is a spring sleeved onto the extending portion.

5. The mouse device of claim 4, further comprising a washer abutted between the housing and the biasing member.

6. The mouse device of claim 1, wherein the housing has a through hole, and the biasing member extends into the accommodating space via the through hole.

7. The mouse device of claim 6, wherein the housing further has two guiding walls protruding into the accommodating space and connected to opposite sides of the through hole, respectively.

8. The mouse device of claim 1, wherein an outer surface of the housing is partially recessed toward the accommodating space to form a recessed portion, the housing further has a pivotal hole located in the recessed portion, and the pivotal portion is pivotally connected to the pivotal hole in the recessed portion.

* * * * *